Nov. 18, 1947.  F. SCHNEIBLE  2,430,890
HEATING AND AIR CONDITIONING SYSTEM
Original Filed July 27, 1939   7 Sheets-Sheet 2

INVENTOR
FRANK SCHNEIBLE
BY
ATTORNEYS

Nov. 18, 1947. F. SCHNEIBLE 2,430,890
HEATING AND AIR CONDITIONING SYSTEM
Original Filed July 27, 1939 7 Sheets-Sheet 3

INVENTOR
FRANK SCHNEIBLE
BY
ATTORNEYS

INVENTOR
FRANK SCHNEIBLE

Nov. 18, 1947.   F. SCHNEIBLE   2,430,890
HEATING AND AIR CONDITIONING SYSTEM
Original Filed July 27, 1939   7 Sheets-Sheet 5

INVENTOR
FRANK SCHNEIBLE
BY
Bartlett
ATTORNEY

Nov. 18, 1947.  F. SCHNEIBLE  2,430,890
HEATING AND AIR CONDITIONING SYSTEM
Original Filed July 27, 1939   7 Sheets-Sheet 7

INVENTOR
FRANK SCHNEIBLE
BY Bartlett Tyre Scott Hat
ATTORNEYS

Patented Nov. 18, 1947

2,430,890

UNITED STATES PATENT OFFICE 2,430,890

HEATING AND AIR-CONDITIONING SYSTEM

Frank Schneible, New York, N. Y.

Continuation of application Serial No. 286,791, July 27, 1939. This application April 10, 1942, Serial No. 438,515

16 Claims. (Cl. 257—52)

This is a continuation of my application Serial No. 286,791, filed July 27, 1939.

This invention relates to the heating refrigeration, and air conditioning of dwellings, apartments, offices, stores, and the like, and generally to the generation, conservation and utilization of heat energy in a manner and by means to reduce substantially the losses in heat energy heretofore experienced in domestic and industrial applications.

One object of the invention is a novel method and apparatus of burning fuel and converting the energy thereof into heat energy in a more efficient and satisfactory manner than has heretofore been possible.

A further object of the invention is a novel method and apparatus for the extraction of heat energy from burning fuel gases and converting the same to useful heating purposes.

A further object of the invention is a central heating system of the above indicated character which is characterized by its flexibility in operation, and by the facility with which heating mediums of different degrees of heating may be obtained therefrom at will and distributed to different locations.

A further object of the invention is a novel heat extracting and converting apparatus which may be readily attached to a conventional central burning unit.

A further object of the invention is a novel method of heating and a central burning and heating unit which is characterized by the burning of the fuel and the extraction of the heat energy from the burning gases thereof to a point below 100° F.

A further object of the invention is a novel and improved heating system which may be readily converted into a refrigeration system at will.

A further object of the invention is a novel and improved all-year-round air conditioning system, with positive control of heating and humidity in winter and positive control of cooling and dehumidifying in summer.

A further object is a new method and principle of heat generation, transference and transmission whereby the heating costs may be substantially reduced, in some cases as much as 50%. In the prior heating apparatus and practices where the average fuel burning temperature is around 1000° F., from 500° to 700° F. are wasted up the chimney. By the utilization of my invention this loss or waste is reduced to below 100° F.

A further object of the invention is the complete removal and heat conservation of the free carbon and soot from the exhaust gases and the elimination of the dangerous carbon monoxide gas from the exhaust gases of heating systems and the elimination of fire hazards.

A further object is the generation of any degree of heat, and the efficient regulation, storage and transmission thereof as may be desired, as for example the generation at 1000° F. and the tapping off at 500°, 400°, 300°, 200° or 100° as may be desired.

A further object is that air conditioning may form an integral part of the new process of heating or cooling without the addition of extra equipment or structural changes in the original plant and without adding substantially to the cost.

A further object of the invention is a method and system which are capable of 100% automatic operation at all times, with the humidity and other controls in continuous operation.

A further object of the invention is to provide a system practically free of fire hazards, a system wherein it is practically impossible to overload or overheat the primary heat chambers. The range of each system is limited only by the limit of capacity of the component parts designed into the same. 100% automatic operation, fire limit and heat control remove the human element and render harmless any improper or careless handling of the system by the operator of the plant or the failure of any part of the apparatus to function properly.

A further object of the invention is a novel and improved system which eliminates the necessity for or the use of chimneys to creat draft for the burning of fuels.

A further object of the invention is to provide a system wherein it is practical and possible to store the heat of, and to regulate and reduce the temperature of, the gases of combustion which are now lost into atmosphere, making it possible to conserve this heat energy and convert it to useful work in its passage through the system.

A further object of the invention is to provide a positive and controllable draft (for the combustion of fuel at the source of the heat energy) through positive and regulative control of the $CO_2$ products of combustion in their passage through the system in cooperation with the means for impelling, retarding and expelling the $CO_2$ products of combustion in the system.

It provides a system for industrial use wherein any degree of heated products of combustion may be safely handled and reduced and converted to useful work, the gases of combustion, less all usable heat energy being vented to atmosphere from the final chamber of the system at or near atmospheric temperatures.

It also provides a means for filtering out all foreign matter (carbon, soot, etc.) from the gases of combustion, the vented gases being substantially free from carbon, soot, and free carbon monoxide gas.

Further objects of the invention will hereinafter appear.

For a better understanding of the invention reference may be had to the accompanying drawings forming a part of this application wherein.

One feature of the invention is the production of the burning mixture of gases from any suitable fuel and according to any conventional practice, and then to pass the products of combustion or hot gases over or in contact with layers of a fluid, preferably water, in a manner to cause the heat energy to be given up by the gases and transmitted to another heating medium, as air, with the simultaneous extraction of the free carbon and soot from the gases. This extraction of heat units is preferably effected in a series of progressive steps by passing the burning fuel gases successively through a series of dome-like chambers over which the heating medium, as air, is passed with the chambers having a bottom layer or floor of water. I have found that the heat energy may be thus largely extracted from the fuel gases until the temperature of the latter is reduced to below 100° F., starting, say, with a temperature of 1000° F. It is believed that the relatively light ascending water vapors evaporated from the surface of the water extract the heat energy from the gases and convey this energy upwardly to the upper walls of the fuel chambers over which the relatively cool air is passing, with the result that these walls take up the heat energy thus delivered while the water vapor ultimately condenses and returns to the body of water on the bottom. The heat extraction is progressive, the burning fuel gases being successively passed through a series of chambers in each of which a part of the heat energy is extracted. The carbon is also removed from the burning gases and loosely deposited on the walls of the chambers from which it may be washed off into the water base. The fuel gases thus having yielded their heat energy to the heating medium are also cleansed of the free carbon and soot and pass out of the last extraction chamber substantially free of harmful CO gas.

In the embodiment of the invention shown in Figs. 1 to 4 the system comprises a series of heat extraction chambers A, B, C, D, E, F, G having dome or arch-like upper walls 1 over which the heating medium air is successively passed, as indicated by the arrows, counter to the progress of the fuel gases through the heat extraction chambers. The passage for the heating medium air is formed on the top by the wall 3, having by preference curvatures, generally following the dome-like sheet metal walls 1 for forcing the air to contact successively with the latter as the air advances. A forced draft fan 4 may be utilized for forcing the air through the passage between the walls 1 and 3 when the natural draft is insufficient. Preferably the air passage 1—3 is insulated on the top and sides by an air passage K, a wall 6 being spaced from the wall 3 for this purpose. The fan 4 supplies air to both the passages H and K through its outlet 5, the latter being connected with the inlet 7 by means of a flexible non-vibration transmitting means 8. The passages H and K empty into a common outlet L for distribution to the spaces to be heated. The extraction of the heat energy from the fuel gases will now be described.

Figure 3:
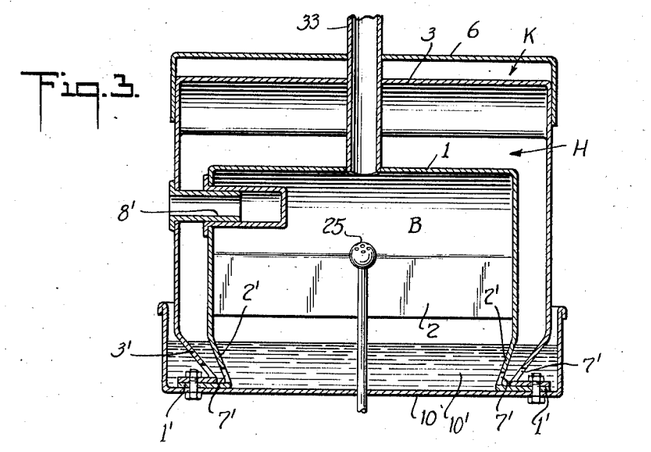
Fig. 3 is a cross-sectional view along the line 3—3 of Fig. 1.
Figure 4:
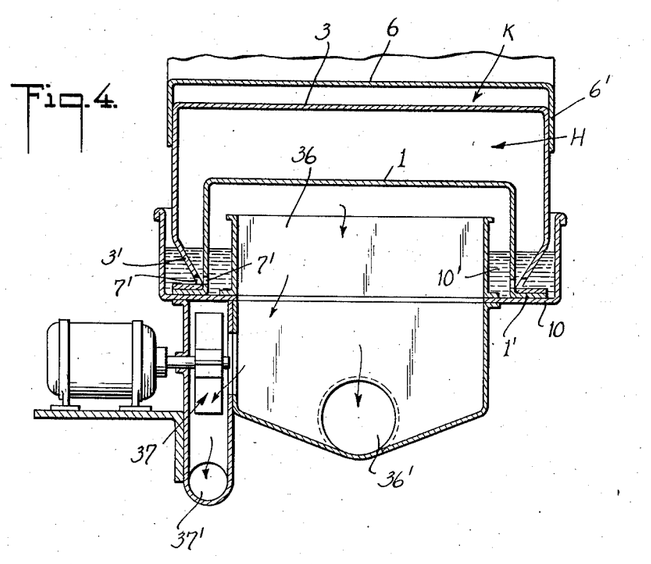
Fig. 4 is a cross-sectional view along the line 4—4 of Fig. 1.

The bottom 10 of the apparatus consists of a level, flat bottom water pan, with an adjustable level ball cock 11, an adjustable level overflow pipe 12 and drain valves 13. The flat bottom may be provided with means such as hand holes (not illustrated) for removal of solid matter, etc. and slightly dished to the hand holes to facilitate the removal of solid matter, carbon, etc. which may be flushed to those points for removal. The water 10' in this pan 10 acts as the lower bounding wall for the other chambers A to G and the air passage H and also acts as the sealing medium between the gas chambers and the air chambers and between the air chambers and atmosphere (Figs. 3–4). The water level is adjustable to various heights.

The inner series of seven chambers are gas chambers. The tops of these chambers are formed in a series of arcs gradually descending towards the bottom of the system, as indicated at 2, the latter more closely approaching the water level towards the right.

The first chamber A is the largest in volume, surface area and height. The succeeding chambers are gradually decreased in volume, surface area and height, the last chamber G being the smallest. The sides and ends of this series of gas chambers are water sealed on the bottom from the surrounding air chambers. Around the gas chambers and spaced therefrom we have another series of seven arc-shaped top chambers in descending series which form the pathway H for the air which is fan circulated through the space between the gas chambers and this first air bounding wall. This space forms an inverted U-shaped tunnel for the air, the bottom being water sealed. The height of this tunnel is greatest over the first or largest gas chamber and diminishes in height, the least height being directly above the last gas chamber where provision is made for the inflow of air from the fan 4.

Directly above the arc-shaped top of the air tunnel and spaced therefrom the second flat topped bounding wall forms a small air passage which acts as a moving air insulating medium between the two air top bounding walls and prevents the direct passage of heat rays from one wall to the other. As the fan forces a stream of air through this small air space this air stream picks up the heat rays as they come through and carries them to outlet L where the two air streams merge.

On the top of one (D) of the gas chambers I provide a water basin 15 with means such as the heater tube 16 projecting into the gas chamber for heating or vaporizing the water thus providing vapor or steam in the air stream under controllable regulation. The water feed to this basin is under automatic relative humidity control. In the particular embodiment shown the means for this control includes a water supply tube 17 extending down through the walls 6 and 3 terminating in an expanded perforated outlet 18 at the top of the pan 15, and a valve 19 in a pipe 20 controls the supply of water to the pan, an automatic electrical control 21 being indicated for this valve.

Each gas chamber may be provided with a water spraying device 25 for cleaning the walls of the chambers, and also for purposes hereinafter explained, each sprayer being supplied through a pipe leading through a valve 26 to a main supply pipe 27. The latter is supplied by a pump 28 taking water through a pipe 29 from the water supply.

In the first chamber A I provide two fuel supply nozzles 30 in parallel and above them two air injector nozzles 31 in parallel. The fuel nozzles 30 direct the flame, as indicated, against the surface of the water while the air nozzles 31 direct the air up against the upper wall of the chamber A.

The positions of these nozzles and the shape of the chamber in conjunction with the reflecting water surface bottom of the chamber act and react to form a whirling mass of burning gases in this chamber which in turn act and react to form a similar whirling mass of gases in the second gas chamber, etc. Rising from the surface of the water, water vapor ascends and enters the burning gases whirling or following the deflected path in the chambers. The gas generated in the first chamber, say at 1000° F. is diluted in heat content and increased in volume by the injected air and by the water vapor. This 1000° of heat may be cut to any degree in the design of the component parts of the system, say from 1000° to 750° in the first chamber, then to 550° in the second chamber, then to 350° in the third chamber, then to 250° in the fourth chamber, then to 150° in the fifth chamber, then to 100° in the sixth chamber, then to 70° in the seventh chamber or atmosphere temperature. With only natural heat flow there is a slight and gradual build up of temperatures in fixed differential throughout the seven gas chambers. It is now practical and possible to run the system with a vent gas control set at 90° maximum shut-off to shut down the burner at that temperature and start again when the vent gas drops to 70°. During the interval the build-up or storage of heat in the seven chambers tends to adjust or balance between atmospheric temperature and the highest heat chamber. No cold air enters the space L during the time the heat radiation into the air stream is tending to cool the chambers as the flow of air is from the fan 4 over the G low heat chamber towards the high heat chamber A. Thus the first effect of the cool air entering the system is on the low temperature chamber. The 90° of heat in this chamber is quickly reduced to the 70° starting or cut-in point and there is another gradual build-up and storage of heat then another cut-out and balancing, etc.

Without the fan in operation it is possible to run the system with an average of 80° stack or vent gases.

With the fan in operation it is possible to hold the stack or vent temperatures within a few degrees of the 70° cut-in point. The average vent or gas temperature will about approximate the average temperature of the fan feed to the system.

In this system the latent heat of evaporation of all the elements in the combustion chamber are recovered plus practically all of the sensible heat of evaporation as the initial temperature of the fuel, etc., is approximately 65°–70°. Thus we have a system in which we recover practically all of the total heat of evaporation of the fuels used or the sum of the latent heat of evaporation and most of the sensible heat of evaporation.

On the second and third chambers there are heat taps 33 for transmision of heated gases to remote places for use at those places, and electrically operated valves 34 are shown controlling the supply. Others of the chambers may be similarly provided with taps. In the last or low temperature chamber there is shown a heated gas tap 35 on top and below the pan there is a vent connection 36 and a compressor unit 37 for further reduction of the gases in the final chamber. The uses for these will be hereinafter explained.

The details of construction of the arched housings 1 for the various chambers may assume different forms and in the particular embodiment shown (Figs. 3 and 4) the housing 1 is of U-shape in cross-section, the sides of the legs of the U terminating in flanges 1' resting on the bottom of the pan 19. The housing 3 is generally of similar U-shape whose sides terminate in inwardly inclined bottom edges 3' and these bottom edges 3' in turn have flanges resting upon the flanges 1'. The housing 6 forming the upper wall of the chamber K is formed with side members fitting over the sides of the housing 3. The sides of the housings 1 and 3 are provided with registering openings 7' to provide for free flow of water and communication between the several chambers. The water floor thereby forms a seal between the passage H and the hot gas chambers and also between these chambers and the atmosphere.

These Figs. 3 and 4 also show the method of increasing or decreasing the surface area of the water floor exposed to the air medium which is circulating through the passage H.

For example, by lowering the water level the surface area exposed to the circulating air is decreased by reason of the inwardly inclined sides 3' and conversely by raising the water level the exposed water surface is increased in area. The humidity of the circulating air may thereby be controlled. Fig. 3 also shows the means for varying surface area in chamber B of the water surface exposed to the hot gases, this being effected by the inwardly inclined bottom edges 2' of the side walls of the chamber B. Preferably the high temperature chambers, such as A, B, etc. have their walls bolted down by the bolts shown in Fig. 3 which pass through the side wall flanges and the pan 10.

This also illustrates the method and means for increasing or decreasing the cubical content or gas capacity of the plant. By raising the surface level, I decrease the cubical gas contents of the system, and increase the base surface area. Decreasing the cubical gas content concentrates the heat, also by raising the surface level of the base I decrease the area of the ports between chambers and thus show the means for regulating the area of the ports between the various chambers of the system. This action in correlation with the swinging port valves hereinafter described provides a positive controllable means for regulating the flow of gases through the system. It provides a means for increasing or decreasing the capacity of the plant at the will of the operator.

The water spray circulation system may be used to increase the heat transference capacity of the system with perfect safety. (Elimination of overheating the boundary walls of the gas chambers.) Spraying water through the hot gases to the walls generates water vapor or free steam (which is condensed in its passage through the system) and prevents the overheating of the walls of the high heat chambers. It is thus possible to step up the fuel burning capacity of the plant.

At 6' is shown a housing having a thermostatic control, the thermostatic control being omitted for convenience in illustration which control may be of any conventional form for controlling the fuel burner by the temperature of the gases or products of combustion in the particular chamber, in this case chamber B, and also chamber G.

Fig. 4 shows a natural or gravity flow outlet 36' for the gases from the last chamber G, which outlet leads to the member 36 and also shows an outlet 37' for receiving the medium which is forced by the fan 37 from the member 36 and chamber G. When the system is used as a refrigerating system, as described more particularly hereinafter (Fig. 7), the outlet 37' may be connected with the intake 30 at chamber A for recirculation of the refrigerating medium.

Figure 1:
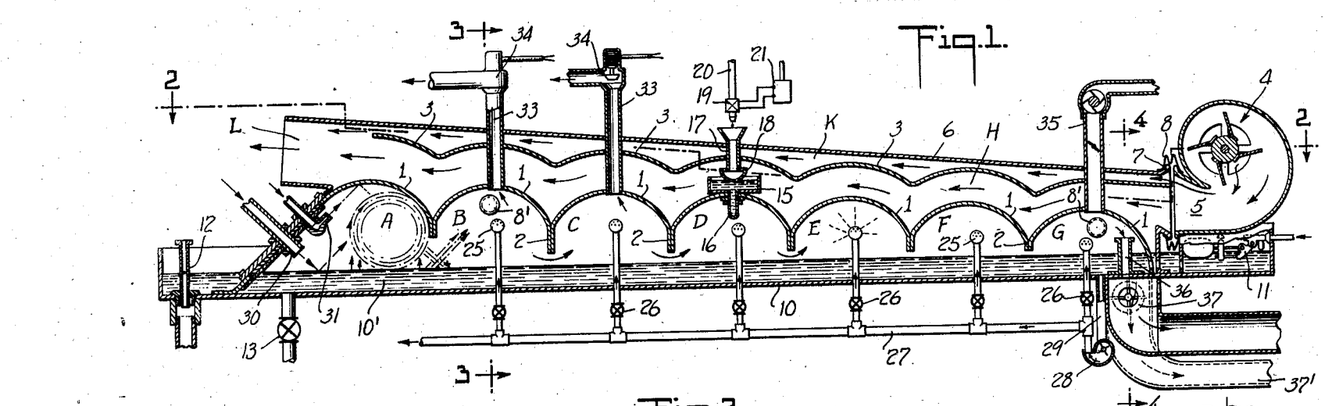
Fig. 1 is a sectional view, somewhat diagrammatic, showing one embodiment of the invention.
Figure 2:
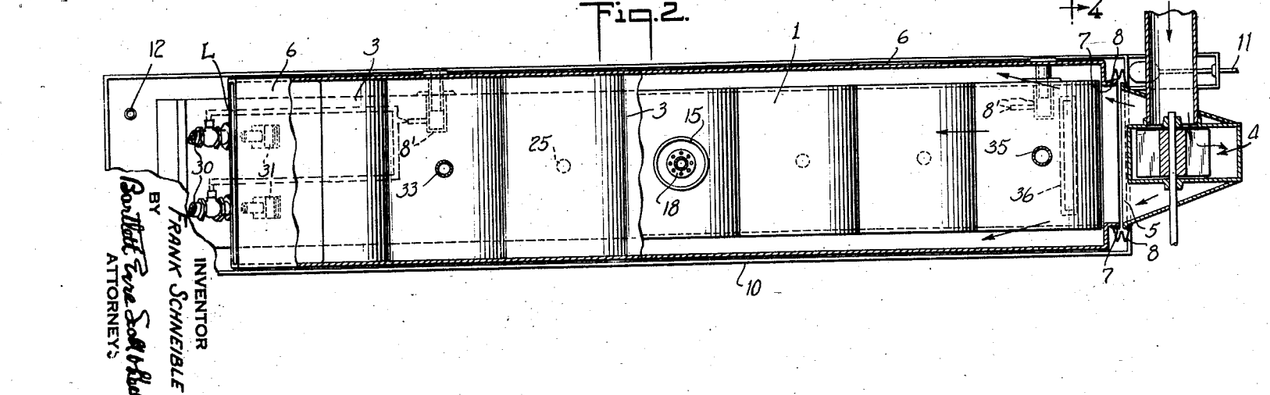
Fig. 2 is a sectional view along the line 2—2 of Fig. 1.
Figure 7:
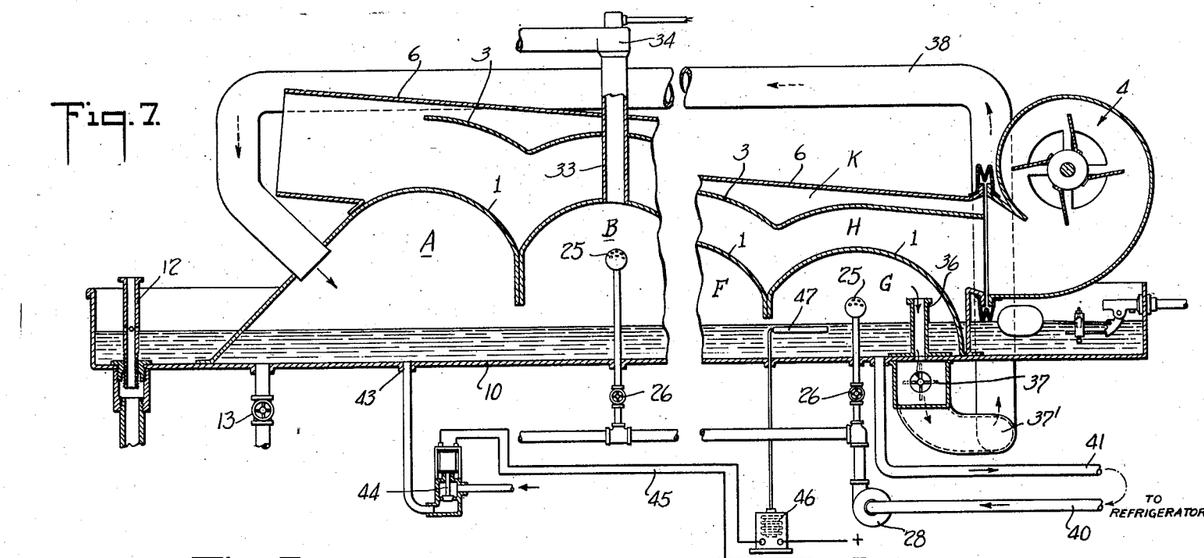
Fig. 7 is a sectional view showing an embodiment of the invention for refrigeration.

Fig. 7 shows the system of Figs. 1 and 2 in use as a cooling system for summer. The fuel nozzles 30 and air nozzles 31 are disconnected and the sprayers 25 are used for spraying the dome walls 1 with a suitable refrigerant, the latter being supplied by the pump 28 which receives the refrigerant through the pipe 40. The refrigerant may be water supplied to the refrigerator (not illustrated) through the pipe 41 and thence through the pipe 40 to the pump 28. For keeping the temperature of the water in the pan below a predetermined value, an auxiliary water supply is indicated at 43 feeding water to the bottom of the system. This is automatically controlled by an electrically operated valve 44 in the auxiliary supply line, the circuit 45 of the electromagnet being controlled by a thermostatic mechanism 46 having a part 47 disposed in the water. The setting is such that when the water gets above a set temperature the valve 44 is opened to supply cold water.

The fan 37 is connected through the outlet 37' with a pipe 38 which leads into the chamber A. There is, therefore, a continuous recirculation of the cold water vapors through the chambers A to G in succession. Thus the system may be readily hooked up for heating as shown in Fig. 1 or for cooling as shown in Fig. 7, it being only necessary to disconnect the fuel burner nozzle 30 in Fig. 1 to connect in the refrigeration means through the pipes 40 and 41 and to connect the outlet 37' with the chamber A for operation as a cooling system.

The system may be readily and with the greatest facility converted to the heating system by changing the connections to those shown in Fig. 1.

Figure 5:
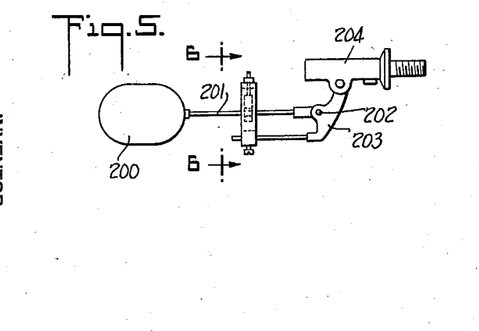
Fig. 5 is a detail of a float control.
Figure 6:
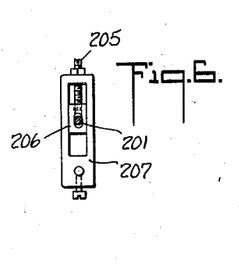
Fig. 6 is a view along the line 6—6 of Fig. 5.

In Figs. 5 and 6 a conventional water level regulator is illustrated having a float 200 mounted on a lever arm 201 which is pivoted at 202 on a pivoted arm 203 which controls a water intake valve 204. The water level is adjustable by screwing down or up on an adjusting screw 205 which limits the upward movement of the block 206 slidably in a guide member 207 carried by the member 203. The height of the water floor level is limited by the position of the adjustable overflow pipe 12.

Figure 8:
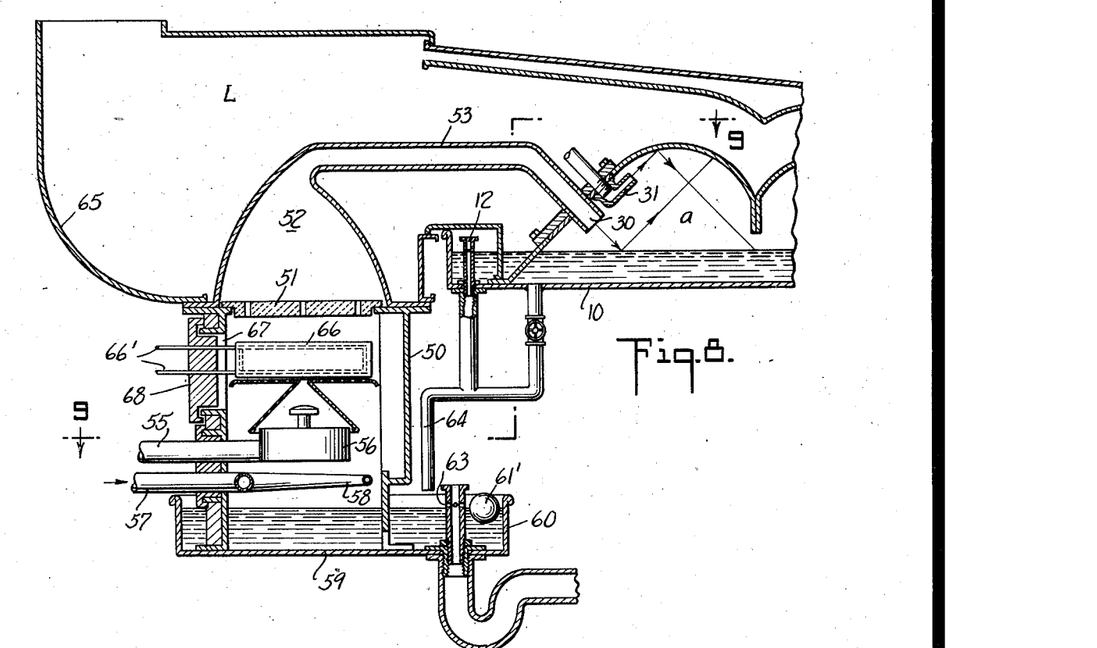
Fig. 8 is a sectional view showing the application of the invention of Fig. 1 to a different type of furnace.
Figure 9:
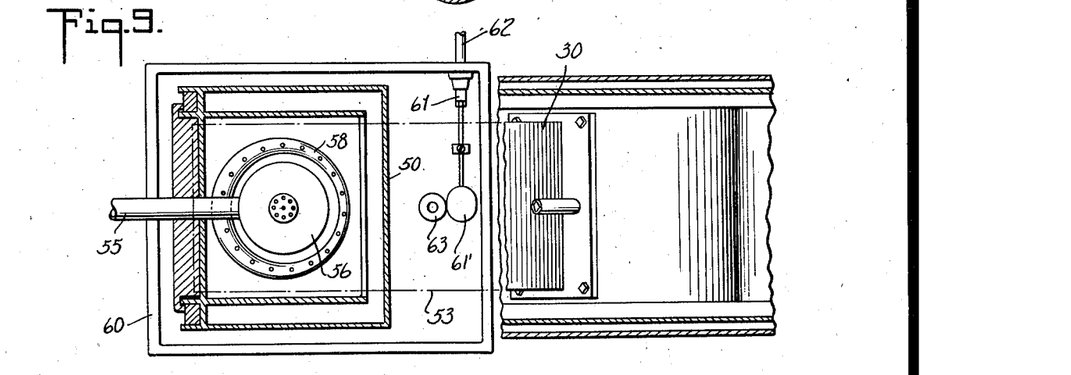
Fig. 9 is a sectional view along the line 9—9 of Fig. 8.

In Figs. 8 and 9 I have shown the system of Figs. 1 and 2 used with a somewhat conventional type of furnace 50, the latter supplying burning fuel gases through a flame breaker 51 into an upwardly converging chamber 52 and thence through a pipe 53 to the induction nozzles 30. In the particular embodiment shown liquid fuel is supplied through a supply pipe 55 to burner 56, and the air supply is through a pipe 57 to a distributing manifold 58, the latter being below the burner 56. A water base 59 is however provided for the conventional furnace, the furnace setting in a pan 60 and the water level being maintained by an automatically controlled valve 61 disposed in the supply line 62 leading from the body of water in the pan 10 and controlled by a float 61'. An overflow is indicated at 63 for limiting the level, while the overflow from pan 10 flows into a supply pipe 64 leading to the pan 60. The air outlet L is in this case provided with a wall 65 surrounding the chamber 52 to minimize loss of energy by useless radiation from the walls of chamber 52. When coal is used instead of liquid fuel the burner 56 and the water base are not used.

In the particular embodiment shown in Fig. 8 the system is used for cooling in summer. For this purpose a cooler 66 is disposed in the furnace above the burner 56 and below the frame breaker 51. This cooler is removably mounted through a door opening 67 and a removable door 68 is provided for enabling the removal of the cooler for operating the system as a heating system during winter. The cooler 66 is supplied with a suitable refrigerant supplied through pipes 66' leading to and from a refrigerating apparatus (not shown). When used as a cooling system, as is shown in Fig. 8, the members 57 and 58 are connected with the outlet 37' of Figs. 1, 2 and 7 and the pump 37 maintains a continuous circulation of the cold air and water vapor through the chambers A to G, the cooler 66 maintaining the recirculating medium in the cooled condition for refrigeration purposes.

The cooling system of Fig. 8 may be used in connection with the cooling system of Fig. 7, with the sprayers 25 assisting in the cooling and also with the regulator 47 functioning to keep the water cool by supplying a fresh supply of cool water to the water floor. The tap 33 may be used for supplying a refrigerant to other places where the same may be used.

Figure 10:
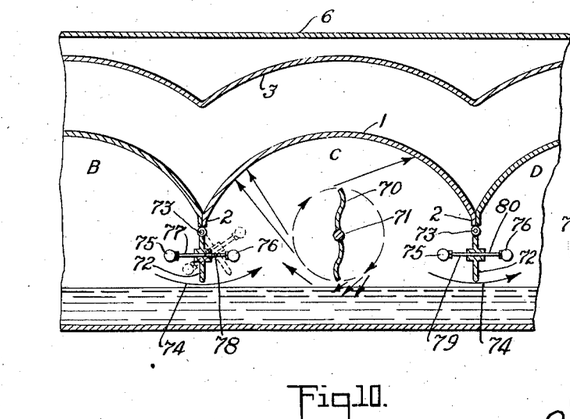
Fig. 10 is a sectional view showing another embodiment of the invention.
Figure 11:
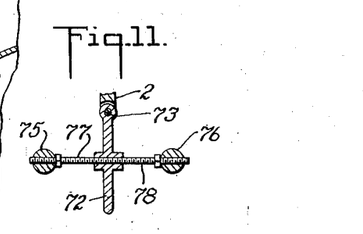
Fig. 11 is a detail view illustrating a regulator of Fig. 10.

Fig. 10 shows a modification of the system of Figs. 1 and 2. Here the chambers B to G, or any number of them, are provided with artificial dynamic means for whirling and causing the gases successively to impinge upon the water surface and the ceilings of the chambers. The means shown comprises a fan 70 mounted in each such chamber upon a drive shaft 71, the fan and shaft being mounted in any suitable manner. The mechanical whirling of the gases increases the efficiency of the heat extraction.

I have also shown in Fig. 10 means for maintaining the desired balance or ratio of temperatures, volumes, pressures or velocities of gases between adjacent chambers. For this purpose there is provided an automatically adjustable gate 72 between each pair of chambers pivoted on an axis 73 for swinging movement thereabout. The lower edge of each gate or port valve stops short of the highest water level when in a vertical position to provide a minimum port area 74 which is open at all times. The gate is automatically swung about its axis 73 to open or close the port to a greater or less extent by any suitable means which responds to relative changes in the adjacent chambers. I have shown diagrammatically such means in the form of a thermal balance comprising a high temperature thermo-balance 75 and a low balance 76 mounted on a thermo-balance lever 77 which is adjustably mounted on the gate 72. For any particular setting the gate is automatically swung to vary the port area when there is a change in the temperature, volume, pressure or velocity of the gases in one chamber relatively to the adjacent chamber, and in a direction to establish the ratio for which the balance is set.

When the volume of the hot gases in the B chamber is greater than that called for by the setting of the port valve controls there will be a gradual increase in the temperature, pressure and velocity of the gases in this chamber. The increase in temperature expands the balance lever 77, the increased leverage swings the port valve and increases the area of the port opening. The increase in volume of the gases in the chamber exerts pressure on the swinging port valve and also increases the area of the port opening. The increase of the port area between B chamber and C chamber allows the gases to pass into the C chamber in greater volume.

If the volume of hot gases passing into the C chamber exceeds the shrinkage or decrease in volume of the gases in C chamber (due to the whirling or rotation of the gases in C chamber) there will be a gradual accumulation and increase in the temperature, pressure and velocity of the gases rotating in the C chamber. This increase in temperature expands the balance lever 79 with resultant increase in area of the port opening between C and D chamber. The increase in volume of the gases in C chamber exerts pressure on the swinging port valve and thus increases the area of the port opening between C and D chamber. The increase in the area of the port opening between C and D chamber allows the gases to pass into the D chamber in greater volume.

The increase in temperature of the gases in C chamber also acts upon the balance lever 78 the expansion of lever 78 resulting in a decrease in the area of the port opening between B chamber and C chamber thus cutting down the volume of gases entering the C chamber from B chamber.

This action gives an adjustable, variable or fixed differential control of adjoining chambers which functions automatically and balances and adjusts itself to variations in initial temperatures, volumes and velocities of generated gases passing through the system. The revolution of the whirler creates a rotating mass of gases. Centrifugal action or force drives the heated gases into contact with the bounding wall of the surface of the reflector (water surface) in the bottom of the system.

The reflector sends the gases back towards the bounding walls or into the mass of gases revolving around the axis of the whirler. The whirling mass of gases also tends to depress the surface of the water reflector surface. This causes a rolling wave effect on the surface of the water which concentrates the heat rays and reflects them back into the rotating mass of gases or directly to the bounding wall.

The water vapor generated in the chamber is a factor which increases the rate of speed of heat transference from the hot gases to the bounding wall.

Figures 12, 13, 14:
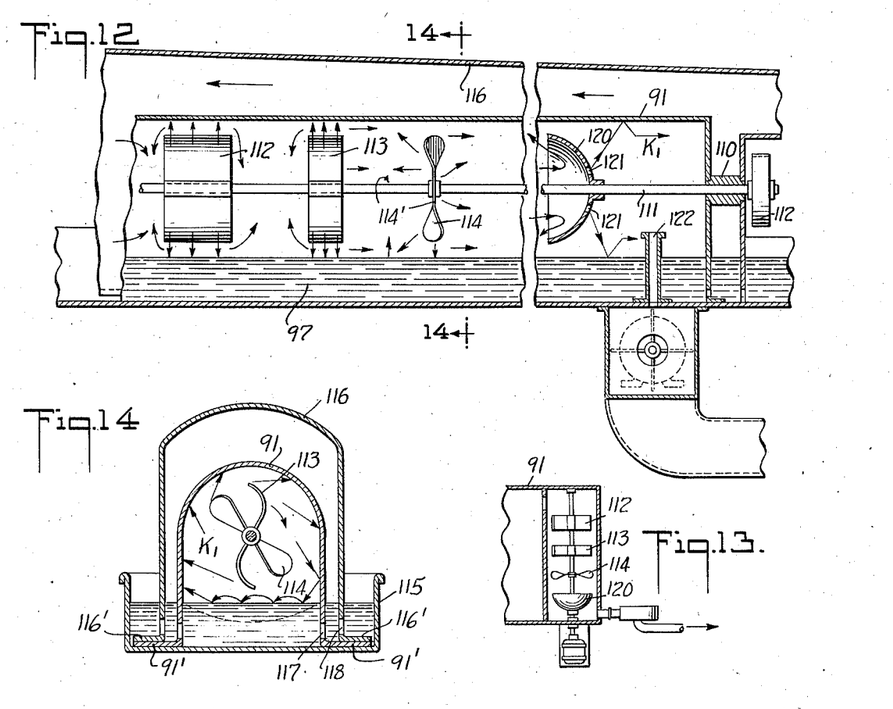
Fig. 12 is a sectional view showing still another modification of the invention.
Fig. 13 is a diagrammatic plan section showing how the embodiment shown in Fig. 12 may be applied to a chamber with the shaft 111 disposed vertically.
Fig. 14 is a sectional view along the line 14—14 of Fig. 12.

In Figs. 12 to 14 I have illustrated a modification of the invention, wherein one or more of the heat extracting chambers is provided with mechanical means for whirling the gases and bringing them in repeated contact with the water base 97 and the roof 91. For this purpose I have shown for rotation on suitable bearings 110 a shaft 111, the latter being driven by a suitable pulley 112 from any suitable source. For convenience in illustration one of the bearings is omitted. This shaft 111 carries a large area whirler 112, a smaller gas whirler 113 and a propeller gas check valve 114. These whirlers 112 and 113 are illustrated as being curved in the particular embodiment shown so as to force the gases outwardly from the center of the chamber into contact with the wall 91 for facilitating the transfer of the heat energy to the wall 91. In this embodiment the enclosing wall 91 of the chamber K1 is provided with base flanges 91' which rest upon the bottom of the pan or trough 115, the latter containing water to the desired level. Also in this embodiment an air circulating passage is provided around the enclosing wall 91 for the purpose of heating the air and conveying this air to places for consumption. This enclosing wall 116 is shaped similarly to the shape of the wall 91 and is provided with base flanges 116' which rest on the bottom of the pan 115. The walls 91 and 116 are provided with passages 117 and 118 near their bottom edges to provide for the ready passage of water therethrough.

At 120 is shown a member which I designate a triple action feed back check and relief valve. This may be operated by and be in fixed relation to the shaft 111 or any variable speed relation to this shaft or it may be motor driven under automatic speed control in relation to the temperature volume pressure or velocity of the feed back gases or the relieved gases. In the particular embodiment shown it is mounted for rotation on the shaft 111. This valve 120 is cup-shaped, cupped in the direction of the progress of the gases and is provided with openings 121 to permit a portion of the gases to pass on as indicated by the arrows.

The gases containing the heat energy which is to be recovered enter the whirl at and around the center of rotation of the shaft 111, and, as indicated above, the whirlers 112 and 113 force the gases centrifugally into contact with the wall 91 and the reflector surfaces of the water base. This action tends to form a concave reflector surface on the water, as indicated in dotted lines in Fig. 14, and sends the gases back towards the wall 91. These gases are thus repeatedly caused to contact with the heat transferring wall 91 for yielding the heat energy to the air circulating between the walls 116 and 91. The arrows indicate the general direction of the gases which are propelled by the whirlers 112 and 113. On the low heat side of the whirler 112 the rejected gases are indicated as thrown into a somewhat neutral zone between the two whirlers and this applies also to the gases whirled on the high heat side of the whirler 113, which results in part of the gases being forced to points around the axis of the planes of rotation of the whirlers. Some of the gases are forced by the whirler 113 to the right, as indicated by arrows, and the propeller 114 is so designed and operated that it will check or retard the high velocity gases in the chamber and send them back into the fields of force of the whirlers 112 and 113. It will at the same time provide a continuous acting pressure relief valve for accumulated or exhausted gases, the blades 114 having no propelling action in the vicinity of the shaft, and the fan operating at a comparatively low speed. This is to permit the exhaust of dead gases to pass out of the system without building up excess pressure in the gas generation chambers of the system. This propeller valve 114 and the check valve 120 cooperatively function together. The latter is constructed in the shape of a concave dish that checks the flow of the rejected gases and the propeller 114 returns a part of them to the neutral zone into the field of force of the whirler 113. In this way a feedback of rejected gases is effected which builds up a counter pressure of gas in the chambers between the propeller valve and the source of heated gases. To relieve this counter pressure of gas and permit the dead gases to pass the propeller check relief valve combination I provide outlet ports 121 in the valve 120 at the point of least resistance, namely adjacent the dead center of rotation, while the propeller blades 114, as indicated, are constructed to be inactive in the vicinity of the axis, namely at the points 114'. The working area of these ports is precalculated according to pressures, volumes, speeds, temperatures, etc. of the gases generated and injected, the mechanical means for generating centrifugal force, the areas of the various radiating walls of the system, the amount of heat extraction and the cubical gas contents of the system.

Figure 15:
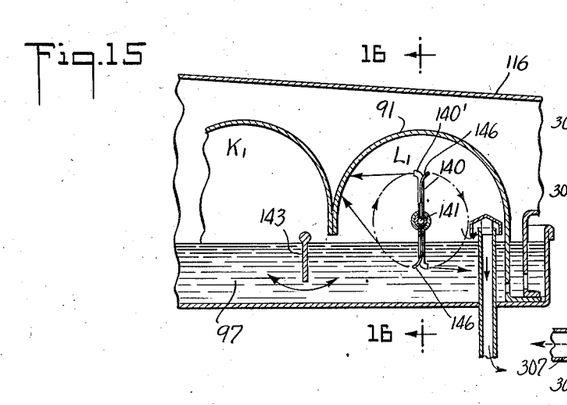
Fig. 15 is a sectional view of still another modification.
Figure 16:
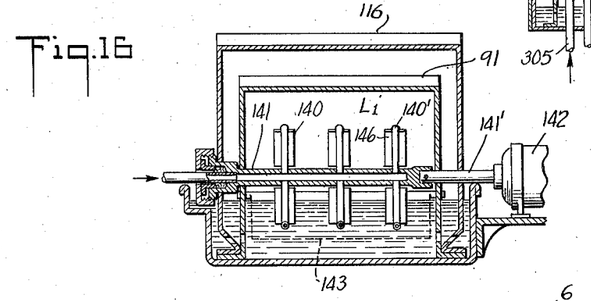
Fig. 16 is a sectional view along the line 16—16 of Fig. 15.

In Figs. 15 and 16 I have shown a modification of the means to rotate or whirl the gases in the low temperature or final chambers of the system before expulsion to atmosphere or transmission to the compressing unit. This means comprises a combined gas whirler and water agitator unit and sprayer 140 which is mounted for rotation on a hollow shaft 141 driven by a motor shaft 141', the latter extending lengthwise of the chamber L1. The shaft 141 may be driven in any suitable manner, as, for example, by a motor 142. This combined whirler agitator and sprayer is constructed and operates as follows:

The member 140 comprises spray nozzles 140' which is supplied with fluid from the hollow shaft 141. Water under pressure is supplied to the hollow shaft 141 in any suitable manner, as for example, by the pump 28 of Fig. 1. Upon the rotation of the shaft and nozzles the latter spray the water as indicated by the arrows against the surface of the boundary wall 91. Under light loads the water issuing from the nozzles 140' may form motive power for turning the shaft 141 without necessitating the use of the motor 142. The member 140 also comprises a paddle part 146. This paddle part dips into the water floor 97 and sprays the same against the wall 91. The paddle surfaces also whirl the gases in the chamber and, accordingly, a mixture of hot gases and water vapor are whirled about the chamber. The water vapor is thus thoroughly contacted with the products of combustion or hot gases to extract therefrom the heat energy and transfer it to the wall 91 and thence to the medium of air flowing in the chamber between the walls 116 and 91. At 143 I have indicated a baffle disposed in the water base adjacent the dividing wall between the two chambers K1 and L1 which is for the purpose of stopping the water movement caused by the paddle or agitating action of the member 140.

Figure 17:
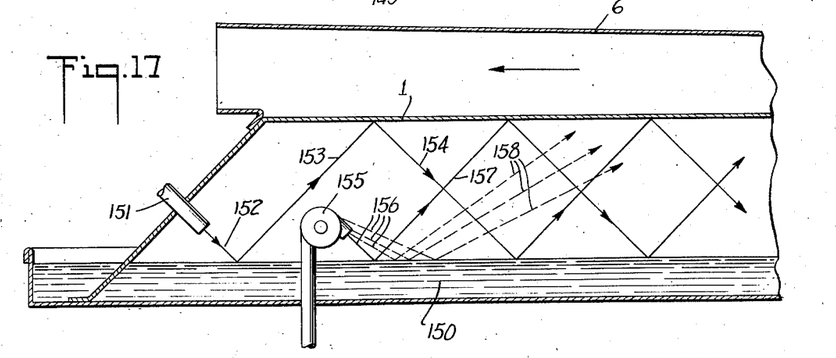
Fig. 17 is a digrammatic view illustrating certain principles of the invention.

In Fig. 17 I have shown diagrammatically the probable progress of the heat energy containing gases through the chambers. The water floor is indicated here at 150 while the upper wall is indicated at 1, and above this is the air circulating chamber for taking up the heat energy which is enclosed by the wall 6. A fuel burner 151 for fuel burning at low temperature is indicated on the left and this burner directs the flame against the surface of the water as indicated at 152. The water surface acting as a reflector, the burning fuel gas is reflected in the general direction of 153 up against the roof 1 which also acts as a reflector which reflects the gas in the general direction at 154, the other arrows indicating the progress of this burning gas in the successive reflections first from the water surface and then from the roof 1. At 155 I have indicated a fuel burner for fuel burning at high temperature. This burner is located in the heat zone of burner 151 whereby the heavy fuels being burned in the burner 155 are preheated and vaporized by the heat from the low temperature burner 151. The burner 155 is mounted for movement in an arc to distribute the high heat gases derived from the burner 155 to the large area of the roof 1. In the full line position the high temperature gases are indicated as being reflected upwardly in the general direction of the arrow 157 against the roof 1 and the dash lines indicating the different positons of the burner showing how with the upward shifting of the burner nozzle the gases reflected from the surface assume the general directions of the arrows 158, which are indicated as striking the roof 1 at widely spaced points. The reflected heat rays and gases are thus positively controlled and are directed toward the upper wall or roof 1 in a continuously moving stream so that the gases contact and transfer heat to the entire radiating area of the wall 1. This results in an efficient and evenly distributed means for transferring the heat from the gases to and through the wall 1 to the air or other medium thereabove. Overheating and hot spots are avoided rendering it practicable to use a very high initial heat from the nozzle 155 in a safe and efficient manner.

Figure 18:
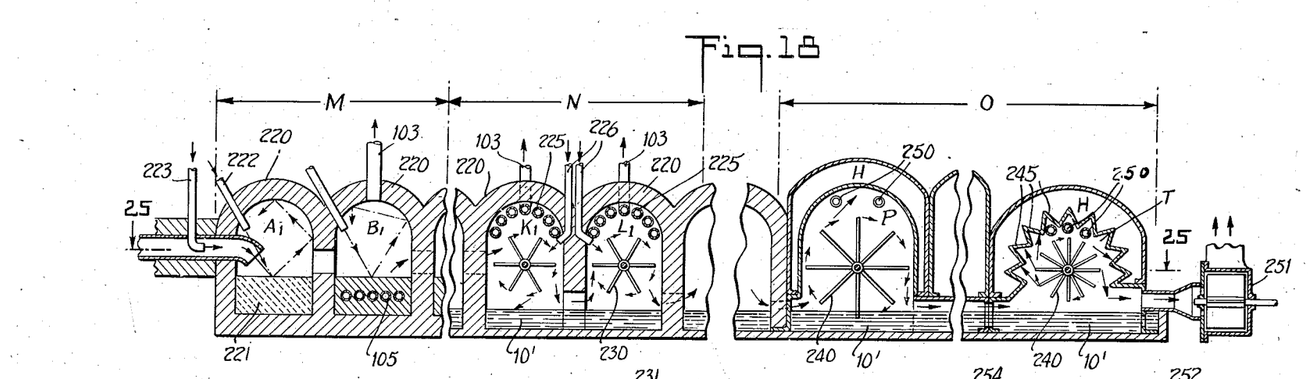
Figs. 18, 19 and 20 show modifications of the invention.
Figure 19:
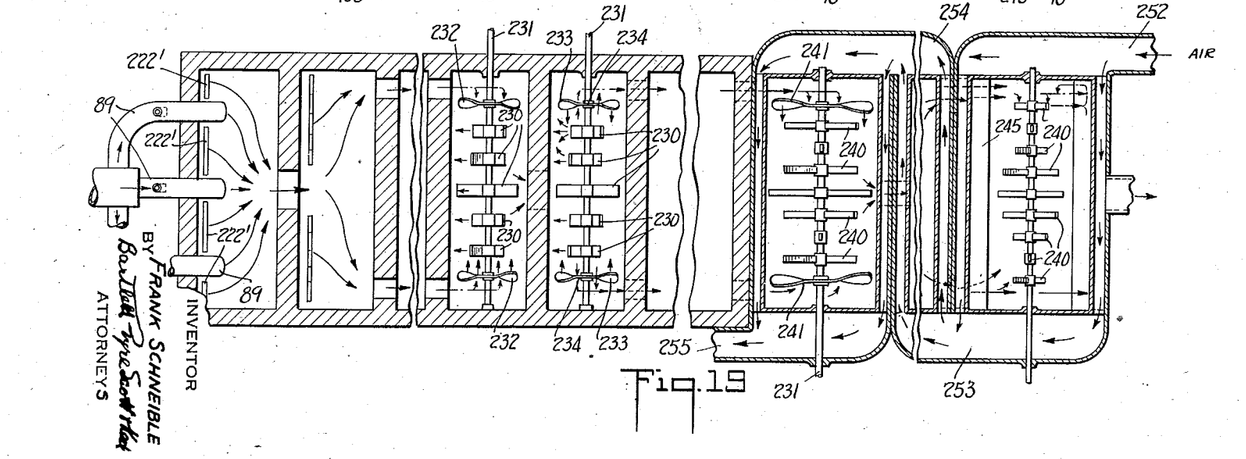

In Figs. 18 and 19 I have shown somewhat diagrammatically my invention as applied to the recovery and conservation of heat energy from waste products of combustion and hot gases and the utilization of such heat energy. Here I have shown three groups of chambers M, N, O, two of such chambers being shown in each instance in each group, but it being understood that other and additional chambers are provided. The group M has high heat chambers with the chambers having walls 220 of insulating material. Here the chamber A1 may be called a diluting and temperature reduction chamber with a base 221 of any suitable material for storing heat energy, as, for example, sand, slag, etc. The air for dilution is indicated as being introduced through a pipe 222 leading to four distributing portions 222' and another pipe 223 leading to the axes of the three branches 89 through which the hot waste gases are delivered to the chamber A1. The chamber B1 is provided with a base of lead or other suitable liquefying metal in which are embedded the steam coils or the like 195.

The group N is also provided with insulating walls 220 and here a liquid base 10' is provided as, for example, a floor of water of the required level. I have shown as embodied in the upper parts of the chambers K' and L' of group N steam or hot water tubes 225, thus utilizing a part of the heat energy yielded in these chambers to heat the water in these tubes 225. I have also shown air intakes 226 for admitting air into the chambers of group N for dilution purposes. In the chamber K' I have shown a plurality of whirlers 230 mounted on a shaft 231 for agitating and whirling the products of combustion and the hot gases within the chamber to cause them to contact with the hot water pipes 225 and the surface of the water floor 10'. There are also mounted on this same shaft two pull propellers 232 located at the ends of the chamber for forcing the products of combustion or air which have just entered the chamber through the openings adjacent thereto towards the center or middle of the chamber. In chamber L' I have shown a similar shaft 231 carrying agitators or whirlers 230 for whirling the gas thereabout and at the ends of the chambers there are mounted two propellers 233 which are so constructed as to propel products of combustion or hot gases towards the center or middle of the chamber, thereby retarding their departure from the chamber. The propellers 233 are carried by the flat plates or arms 234 mounted on the shaft 231, these flat plates or arms 234 having no propelling action in either direction, thereby permitting the portion of the hot gases which are near the shaft 231 to pass on through for exit from the chamber through the end outlets indicated. At 103 are indicated the taps for taking out hot gases for heating purposes. The group of chambers O also has a liquid base 10' and each is provided with a circulating passage H for circulating the medium to be heated therethrough. The first of these chambers in group O, which is marked P, is provided with a multiplicity of combined water paddles and gas whirlers 240 mounted on the shaft 231, with two end propellers 241 for propelling the products of combustion or hot gases towards the center or middle of the chamber for exit at the outlet there indicated. The operation of these combined paddles and whirlers 240 is similar to that described in connection with Figs. 15–16, except that here the water nozzles are omitted. In the last of the chambers of group O, which is indicated at T, I have also shown a plurality of whirlers 240 mounted on a shaft 231 for whirling the hot gases against the enclosing walls of the chamber and against the surface of the liquid floor. The enclosing wall of this chamber T is star-shaped in cross-section as indicated and the walls 245 against which the plates 240 throw the hot gases are so constructed and arranged that the angle of the impact as indicated by the arrows approaches as nearly as practicable right angles, this being the most efficient arrangement for transfer of the heat energy to the enclosing walls for transmission to the hot air being circulated. There is also a tendency for the water vapor and the gases to be trapped and held in contact with this zigzag enclosing wall thereby giving greater opportunity for the heat energy to be delivered to the air to be heated. At 250 I have shown preheating water tubes for utilization of the low temperatures before exhausting to atmosphere. Associated with these chambers of group O and also the air circulation passages H as described above are the passage of air to be conditioned and it is understood that the humidifying means of Fig. 1 may be used in these passages if desired. At 251 I have shown a suction fan for assisting in creating the desired draft through the system from the source of the products of combustion. This suction fan 251 may be automatically controlled in any conventional manner to provide the draft desired at the source of the hot gases, as for example having the speed of the fan or its capacity dependent upon the draft required to maintain the combustion at the source of the gases.

At 252 is shown an intake for air to be conditioned, which air may be supplied by any suitable means not shown. This intake 252 is connected at one end with the passage or chamber H above the hot gas chamber T and the air flows longitudinally of the walls 245 of the star-shaped enclosing wall to the other end 253 of the chamber. From the end 253 the air is introduced into the next succeeding air passage chamber associated with the hot gas chamber adjacent to the chamber T and here the air to be conditioned is supplied to the other end 254 of the adjacent air passage. Thus the air being conditioned traverses the air passage chambers longitudinally of the hot gas chambers and finally reaches the exit 255 of the passage or chamber H of the hot gas chamber P. The air thus conditioned is supplied to the place of use and may if desired be eventually returned to the intake 252.

Figure 20:
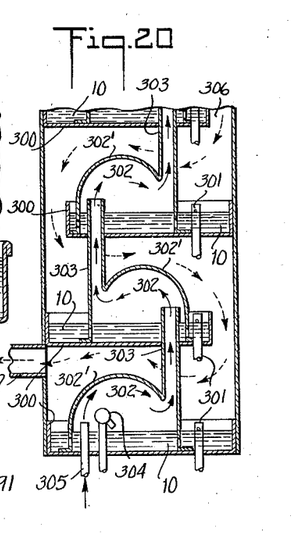

In Fig. 20 I have shown the vertical disposition of the adjacent hot gas chambers. A series of vertically disposed and spaced pans or receptacles 300 are shown which contain floors of water 10, which floors of water are maintained at the desired level by adjustable overflow pipes 301, the overflow from one water pan flowing down into the one underneath. The hot gas chambers are indicated at 302 and these chambers are successively connected together by the pipes 303, these pipes extending in each case above the water level of the vessel 300 of the chamber into which it empties. The fuel burner 304 is indicated as having its nozzle supplying a flame playing upon the surface of the water in the lower chamber 302 and at 305 is indicated a means for the introduction of air or the like. The mixture of the hot products of combustion from the nozzle 304 and the air supply through the pipe 305 passes upwardly in a direction of the arrows to contact with the roofs 302' of the hot gas chambers with the resultant conveyance and transmission of the heat energy from the gases to these enclosing walls. The air to be conditioned flowing from about the upper chambers 302' through 306 is brought into intimate contact with the upper enclosing wall 302' and then flows downwardly to be brought into intimate contact with the enclosing walls of the next chamber 302, etc., the outlet of the air to be conditioned being indicated at 307.

At 31 of Fig. 1 I have shown a means for the injection of a carrier gas (such as air or the like) into the flow or path of the products of combustion ($CO_2$ etc.) in chamber A.

Similar means may be provided at other places in the system if desirable.

The use of atmospheric air for this purpose is indicated as an unlimited supply of the same is available at all times.

This supply of air may be positively controlled and regulated as to volumes, velocity, pressure, etc. The means for such control and regulation are omitted from the drawings for convenience in illustration.

The direction of the lines of force of the injected carrier gas may be utilized by positioning the injector nozzles 31 at various places or at various angles, etc. Its position as shown at 31 of chamber A directs the carrier gas into the reflected lines of force of the products of combustion (issuing or entering from fuel nozzle 30) and the lines of force of the rising water vapor (heat carrier gas) generated by the heat of the products of combustion on the surface of the liquid (water) floor of the chambers. In the position shown it tends to create a whirling mass of the combined gases ($CO_2$ products of combustion plus water vapor plus air) in this chamber as indicated by the arrows.

The volume of this supply of carrier gas (air) may be controlled by the temperature of the combined mixture of gases ($CO_2$ plus water vapor plus air) in chamber A or any of the succeeding chambers, to maintain the desired degree of heat in these chambers. A thermostatic control member of the carrier gas control circuit, similar to that indicated or shown at 8' of chamber B, may be provided for this purpose in chamber A or elsewhere as desired.

The injected carrier gas (air) absorbs heat from the $CO_2$ gas products of combustion and in contacting the surface of the liquid (water) floor generates additional water vapor in its passage throughout the system.

We now have a combination of injected carrier gases (air) plus $CO_2$ products of combustion, plus water vapor (generated by the $CO_2$ products of combustion) and plus water vapor (generated by the carrier gas (air)).

The specific gravity of these elements at 32° F. and atmospheric pressure are as follows:

$CO_2$ gas products of combustion______ 1.5197
Atmospheric air $N_4O$________________ 1.0000
Water vapor $H_2O$___________________ 0.6218

From the above it is evident that individually or collectively the carrier gases, atmospheric air and water vapor are of lesser relative specific gravity or density than $CO_2$ gas at equal temperatures and equal pressures. Temperatures and pressure being equalized in this system, the injected carrier gas (air) and the generated carrier gas (water vapor) probably react instantly to the action of the heat of the products of combustion as follows: Absorption of heat by the carrier gases from the $CO_2$ products of combustion acts to increase the volume of the carrier gases, and the transference of heat from the $CO_2$ products of combustion to the carrier gases reacts to decrease the volume of the $CO_2$ products of combustion. Upon equalization of temperatures, the relative increase in the volume of the carrier gases is greater than the relative decrease in the volume of the $CO_2$ products of combustion. The net result of this action and reaction being as follows:

Water plus heat expands into water vapor of relatively greater volume than the initial volume of original water.

Air plus heat expands into relatively greater volume than the initial original volume of air injected.

$CO_2$ products of combustion less heat transferred to the carrier gases and the water floor contracts into a relatively smaller volume than the initial volume of $CO_2$ products of combustion in the chamber.

The volume of combined gases in the chamber is now equal to the sum of the volume of air injected and expanded by heat, plus the volume of water vapor generated by heat, plus the volume of $CO_2$ products of combustion contracted by the loss of heat. This sum total of volumes of the combined gases being much greater than the original volume of the $CO_2$ products of combustion results in the original heat content of the $CO_2$ products of combustion being transferred to a combination of gases of relatively greater volume and relatively lower temperature. The greater volume of combined gases is therefore forced to contact a larger area of the heat transferring boundary walls of the gas chambers and the temperature of the combined gases has been reduced and is much lower than that of the original initial $CO_2$ products of combustion. High initial heat may thus be diluted and used safely without dangerous concentration and overheating of the primary heat chambers of the apparatus.

The resultant of the co-related increase in relative volume and decrease in relative density of the carrier gases in combination with the decrease in volume and increase in density of the $CO_2$ products of combustion is the tendency of the carrier gases to rise through the $CO_2$ products of combustion to their respective relative positions in space. The means for transference of heat energy (the upper boundary wall I of the chambers A—G) is interposed between the $CO_2$ products of combustion and space, the rising carrier gases are therefore forced to contact the boundary wall I and in so doing they transfer some of their contained heat energy to the boundary wall I of the chambers A—G and thence to the means for utilization of heat energy, the air passing above the boundary wall I in the passage H.

Contact of the carrier gases (air and water vapor) with the boundary wall I of the gas chambers A—G and the resultant transfers of heat by the carrier gases to the boundary wall I reacts upon the carrier gases. The consequent reduction in temperature and relative increase in density of the carrier gases causes them to fall into the path of the $CO_2$ products of combustion, combining with or being carried along with the $CO_2$ products of combustion until the equalization of the temperatures of the $CO_2$ products of combustion and the carrier gases causes a change in the relative densities of the combined or merged gases the carrier gases thereupon rising through the $CO_2$ products of combustion in a continuous cycle of heat transferring movements from the CO₂ products of combustion to the boundary walls of the gas chambers or other means for utilization of heat energy interposed between the CO₂ products of combustion and atmosphere.

The cycles of movement of the carrier gases (air and water vapor) continue throughout the system and it is believed that the carrier gases in their progress through the chambers A to G (Fig. 1) rise and fall and assume wavy paths somewhat in the nature of a multiphase alternating current of heat energy emanating from a moving base or source of heat energy.

The gas chambers A—G constitute an open vessel, with port openings or gates between adjacent chambers having a fixed minimum area of opening at all times as indicated by the arrows under 2 of Fig. 1 and arrow 74 of Fig. 10. A free and unobstructed passage is thus provided to permit the relatively heavier or denser, lower temperature CO₂ gas products of combustion to pass through the system towards the final chamber G and outlets to atmosphere 36'—37' of Figs. 1 and 4.

The use of air as one of the carrier gases is preferred as an unlimited supply is available at all times, the said supply being positively controllable as to quantity and temperature of air injected to accomplish a specific reduction or dilution of heated products of combustion. We thus have an independent means (independent of the source of supply of CO₂ gas products of combustion, and independent of the means for and the rate of heat transference) to controllably regulate the temperature of the gases of combustion and the water vapors generated by the gases of combustion and also the water vapor generated by the air carrier gas itself. It is practically possible to controllably regulate the temperature and the volumes of combined or merged CO₂ gas products of combustion and carrier gases in any of the chambers of the system.

Under the same condition but without the use of heat dilution and heat distribution by means of carrier gases such as water vapor and air, we would have a concentration of heat in the high heat chambers and a gradual build up of heat in all the gas chambers of the system to the temperature of the initial source of supply of heat, say 1000° F. This build up of high heat would depend entirely upon the ratio of heat generated and heat transferred through the walls of the gas chambers to the air means for utilization of heat. We would also have wastefully high stack or vent gas temperatures and excessively high temperatures at the outlet L and in the combustion chamber A.

The invention provides means to increase the fuel burning capacity and the heat transference capacity of the system with absolute safety. For example by stepping up the heat generating unit or fuel burner and using the water sprayers in the gas chambers to spray the gas chamber walls with water or water vapor and by stepping up the supply of diluting air and increasing the cubical gas contents of the entire system and increasing the areas of all gas ports between chambers by lowering the surface of the reflector floor of the system, thereby distributing the larger volume of heated gases over a larger area of the heat transferring walls of the gas chambers; by stepping up the speed of the fan feed of circulating air through the air chambers of the system.

The amount of safe increase of capacity is limited only by the limit of increased capacity of the component parts designed into the system by the builder. Overheating of the high heat chambers is practically eliminated as the moment you increase the supply of heated gases, these gases generate additional water vapor. Water vapor reacts instantly to changes of temperature. The same applies to the added diluting air.

Increase in temperature results in an immediate expansion or increase in volume of the additional water vapor plus the additional diluting air, in the high heat chambers. As the series of gas chambers constitute an open vessel, there is an immediate flow of combined heated gases from the source of supply into the succeeding chambers of the system until the balanced differential state of equilibrium of gases is established throughout the system. The stepped up or additional heat generated is thus differentially distributed over the entire heating surface of the gas chambers. Overheating at any particular place is eliminated. Overloading beyond the limits built into the system could result at most in an increase in the temperature of the gases vented from the fuel chambers of the system, such increase beyond the set limits of the vent control indicated at 8' of chamber G of Fig. 1 would automatically result in the cutting out of the fuel supply or source of heat energy. In the event of the failure of the vent gas control to operate and cut out the source of supply of heat energy the fire limit control in the high heat chambers of the system operate to do this as soon as the temperature in the high heat chambers reaches the set limit of this control (indicated at 8' of chamber B of Fig. 1). Fire hazard and explosion hazard are eliminated.

The advantages of the use of water at temperatures above 39° F. and utilization in the system are, among other things, that it is a perfect heat reflector, throwing back heat rays, a perfect deflector, swerving, bending or turning aside heat rays, a perfect diffuser, scattering or spreading heat rays all around, a refractor, bending back heat rays from their direct course, a one-way conductor of heat, upward towards the perpendicular and prevents the radiation of heat downward through the bottom of the apparatus, adaptable to adjustment, removable, replaceable, a means for generation of water vapor by the CO₂ products of combustion, a means for generation of water vapor by the injected air, a source of water vapor, carrier gas transferring heat upwardly, a source of water vapor filtering and cleaning agent for gases of combustion, a source of water vapor preventing overheating of any part of the system, a source of free steam, instantaneous distributor of high heat, and a source of free steam, instantaneous diffuser of high heat in the system.

The water floor forms a means for instantly cutting high initial heat and distributing the same throughout the chambers of the system, the water vapor is filtering element (for carbon, soot, etc.), the height of water surface controls the cubical gas content of the system, and the relative minimum open port areas between chambers, the injection of water provides a controllable means to regulate temperatures, volumes, etc., of heated gases in any part of the system, the height of surface controls the length of the reflected heat wave or the distance between crests of the waves. The water in the system provides an ever changing reflector floor surface, self-leveling and variable as to height, is vaporizable, condensable and returnable for reuse automatically replenishable or replaceable or removable, forms a means for cleaning the walls of the system, a means for flushing the floor of the system, a means for removing solid matter, carbon, etc., from the bottom of the system, a water seal for bottoms of chambers, seals between gas chambers and air chambers, seals between air chambers and atmosphere, a means for direct mechanically controllable transference of heat from gases of combustion, water sprays and water paddles, etc., a controllable means for the generation of water vapor (controllable as to quantity and point of application), a means for the transference or transmission of heat by the evaporation of water and condensation of water vapors, a means for humidifying the circulating air, a means for dehumidifying the circulating air, a means for increasing or decreasing the surface area of water floor in the gas and the air chambers, a means for increasing or decreasing the cubical refrigerant gas contents of the system (variable height), a direct means for cooling the circulating air in the air chambers and the refrigerating means in the gas chambers, a means for circulating a cooling medium in the air chambers (pump 28, Fig. 1, causes circulation between air and gas water bases) and in the gas chambers, a means for filtering the air passing through the air passages of the system, a means for flushing out the system and removing accumulation of foreign matter removed from the circulating air, a means for the generation of water vapor either through sprays or paddles or passage of air over water surfaces, and means for refrigeration through evaporation of water and condensation of water vapor.

While I have described my invention as particularly applicable to use in dwellings, factories, etc., it is understood that certain features of the invention are applicable to use on motor vehicles, ships, trains, etc., to effect air-conditioning, to recover and utilize the contained heat energy of the waste gases, waste steam and products of combustion and to purify the exhaust gases and eliminate the deadly CO gas, etc.

I claim:

1. In a heating system, a plurality of chambers having arched roofs of heat conducting material, said chambers also having a floor of water and chamber partitions stopping short of the water level to form gates for the passage of products of combustion successively through the chambers, means for circulating a medium to be heated through a passage having as one of its enclosing walls said heat conducting walls and means for causing products of combustion to pass successively through said chambers, and said passage for the medium to be heated having a partition for dividing the passage into an upper and lower passage.

2. In a heating system, two or more chambers through which products of combustion are caused to circulate in succession, said chambers having a liquid floor and heat conducting enclosing walls, means for circulating a medium to be heated successively about the outside of the walls of said chambers and means for causing products of combustion to pass successively through said chambers to transfer heat through said walls to said medium, a humidifying vessel being disposed adjacent to one of said chambers, said vessel being provided with heating means disposed in the path of the products of combustion passing through said chamber.

3. In a heating system, a chamber through which products of combustion are circulated, said chamber having a water floor and enclosing walls of heat conducting material, means for passing a medium to be heated about said heat conducting walls and means for introducing into said chamber products of combustion and causing said products of combustion to impinge upon said water floor at an acute angle thereto, and means for introducing diluting air into said chamber and causing the same to impinge upon the roof of said chamber.

4. In a system for the recovery of heat energy from products of combustion, a plurality of chambers having heat conducting upper and side walls for transference of heat therethrough to a medium and through which the products of combustion pass, an adjustable height floor for said chambers for varying the cubical volume of the gas contents of the chambers of the system and the area of the port openings between adjacent chambers, and additional chambers for the passage of air to be conditioned, said last mentioned chambers having a surface area of water exposed thereto together with means for varying said area.

5. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, and means including an air passage disposed adjacent to and in heat interchange relation with said chambers through said conducting enclosing walls for passing air to be heated in close proximity to the heat conducting enclosing walls and in a direction opposite to the movement of the products of combustion.

6. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, means including an air passage disposed adjacent to and in heat interchange relation with said chambers through said conducting enclosing walls for passing air to be heated in close proximity to the heat conducting enclosing walls and in a direction opposite to the movement of the products of combustion, and a propeller in at least one of said chambers for propelling the products of combustion into contact with the water floor surface and into contact with the conducting enclosing walls.

7. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, means including an air passage disposed adjacent to and in heat interchange relation with said chambers through said conducting enclosing walls for passing air to be heated in close proximity to the heat conducting enclosing walls and in a direction opposite to the movement of the products of combustion, and a propeller in at least one of said chambers for propelling the products of combustion into contact with the water floor surface and into contact with the conducting enclosing walls, the blades of said propeller dipping into the water floor and spraying the interior surface of the heat conducting walls with a mixture of water spray and products of combustion.

8. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, means including an air passage disposed adjacent to and in heat interchange relation with said chambers through said conducting enclosing walls for passing air to be heated in close proximity to the heat conducting enclosing walls and in a direction opposite to the movement of the products of combustion, and a water sprayer disposed in one or more of said chambers at a point above the level of the water floor for the purpose set forth.

9. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, and means including an air passage disposed adjacent to and in heat interchange relation with said chambers through said conducting enclosing walls for passing air to be heated in close proximity to the heat conducting enclosing walls and in a direction opposite to the movement of the products of combustion, the means for causing the products of combustion to impinge upon the surface of the water floor comprising guiding chamber walls and partitions between the chambers with gates adjacent the water surface through which the products pass from one chamber to the next.

10. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, and means including an air passage disposed adjacent to and in heat interchange relation with said chambers through said conducting enclosing walls for passing air to be heated in close proximity to the heat conducting enclosing walls and in a direction opposite to the movement of the products of combustion, at least one of the passages between adjacent chambers including a controlling gate operative responsively to differences in temperature between the adjacent chambers.

11. In a hot air heating and distributing system, two or more chambers through which products of combustion are caused to circulate in succession, said chambers having a common water floor and heat conducting enclosing walls, means for passing hot products of combustion successively through said chambers and causing the same successively to impinge upon the surface of the water floor as they pass through the chambers but without passing through the body of the water floor, means including an air passage disposed adjacent to and in heat interchange relation with said chambers through said conducting enclosing walls for passing air to be heated in close proximity to the heat conducting enclosing walls and in a direction opposite to the movement of the products of combustion, a propeller in at least one of said chambers for propelling the products of combustion into contact with the water floor surface and into contact with the conducting enclosing walls, the blades of said propeller dipping into the water floor and spraying the interior surface of the heat conducting walls with a mixture of water spray and products of combustion, and baffle means disposed in the water floor to counteract the distributing effect of the propeller.

12. In a hot air heating and distributing system, two or more chambers through which products of combustion are caused to circulate in succession, said chambers having water floor surfaces and heat conducting enclosing walls, means for passing hot products of combustion successively through said chambers and causing the same successively to impinge upon the water floor surfaces as they pass through the chambers but without passing through the body of the water, and means including an air passage disposed adjacent to and in heat interchange relation with said chambers through said conducting enclosing walls for passing air to be heated in close proximity to the heat conducting enclosing walls and in a direction opposite to the movement of the products of combustion, said means for causing the hot products of combustion to impinge upon the water floor comprising guiding chamber walls and partitions between the chambers having gates adjacent the water floor.

13. In an air heating system, a group of two or more heat extracting chambers having roofs of heat conducting material and water floor surfaces for successively extracting heat energy from products of combustion and transmitting such energy through the roofs without heating the water floors, passages between adjacent chambers for the passage of products of combustion from one chamber to the next, means including an air passage disposed adjacent to and in heat interchange relation with said chambers through said conducting roofs for passing air to be heated in close proximity thereto and successively therepast and means introducing hot products of combustion first into one of said chambers and then into the other chambers in succession through said passages, said products being introduced into and passed through said chambers without penetration of the water floors and the flows of said air to be heated and the products of combustion being in opposite directions.

14. In an air heating system, a group of two or more heat extracting chambers having roofs of heat conducting material and water floor surfaces for successively extracting heat energy from products of combustion and transmitting such energy through the roofs without heating the water floors, passages between adjacent chambers for the passage of products of combustion from one chamber to the next, means including an air passage disposed adjacent to and in heat interchange relation with said chambers through said conducting roofs for passing air to be heated in close proximity thereto and successively therepast and means introducing hot products of combustion first into one of said chambers and then into the other chambers in succession through said passages, said products being introduced into and passed through said chambers without penetration of the water floors and the flows of said air to be heated and the products of combustion being in opposite directions, said passages being restricted and of relatively small area as compared with the cross sectional areas of the chambers and being arranged to exhaust the products of combustion from the chambers at points below the level of the chamber roofs.

15. In an air heating system, a group of two or more heat extracting chambers having roofs of heat conducting material and water floor surfaces for successively extracting heat energy from products of combustion and transmitting such energy through the roofs without heating the water floors, passages between adjacent chambers for the passage of products of combustion from one chamber to the next, means including an air passage disposed adjacent to and in heat interchange relation with said chambers through said conducting roofs for passing air to be heated in close proximity thereto and successively therepast and means introducing hot products of combustion first into one of said chambers and then into the other chambers in succession through said passages, said products being introduced into and passed through said chambers without penetration of the water floors and the flows of said air to be heated and the products of combustion being in opposite directions, the heat extracting chambers being of decreasing volumetric dimensions in the direction of the flow of the products of combustion.

16. In a heating system, a group of two or more heat extracting relatively deep chambers having roofs of heat conducting material and water floor surfaces, gates of restricted area formed below the level of the roofs and at the water floors between the chambers for the passage of products of combustion successively through the chambers, means introducing hot products of combustion into a chamber and causing them after partial extraction of the heat energy therefrom in said chamber to pass successively through the other chambers and through said gates in proximity to said water floors, and means including an air passage disposed adjacent to and in heat interchange relation with said roofs, for passing air to be heated in close proximity to the conducting roofs.

FRANK SCHNEIBLE.

REFERENCES CITED

The following references are of record in the file of this patent:

UNITED STATES PATENTS

| Number | Name | Date |
|---|---|---|
| 1,941,734 | Black | Jan. 2, 1934 |
| 1,164,818 | Ivor | Dec. 21, 1915 |
| 2,164,718 | Norman | July 4, 1939 |
| 836,826 | Pettit | Nov. 27, 1906 |
| 1,941,365 | Patterson et al. | Dec. 26, 1933 |
| 1,083,395 | Freeman | Jan. 6, 1914 |
| 1,983,294 | Huttenmiller | Dec. 4, 1934 |

FOREIGN PATENTS

| Number | Country | Date |
|---|---|---|
| 38,674 | Denmark | Apr. 16, 1928 |